UNITED STATES PATENT OFFICE.

JOHN L. KINGSLEY, OF NEW YORK, N. Y.

IMPROVEMENT IN COMPOUNDS FOR STEREOTYPE-PLATES.

Specification forming part of Letters Patent No. 9,548, dated January 18, 1853.

*To all whom it may concern:*

Be it known that I, JOHN L. KINGSLEY, of the city of New York, in the county and State of New York, have invented a new and Improved Composition, which I call a "Metallic-Gum Composition," and process of making the same, the composition being made of metals and gums, (as caoutchouc and gutta-percha,) and is peculiar for its great hardness. At the same time it may be softened again and again by heat.

The nature of my invention consists in the process of preparing and using compositions made by grinding metals, earths, and such like materials, with the raw or uncured gums of gutta-percha and caoutchouc, (india-rubber,) the process of mixing being more fully hereinafter described, after which the variety of the compositions and the method of applying to use will be considered or referred to.

I provide a suitable quantity of the gum, (gutta-percha,) when it is desired to use that gum only; or, if both gums are to be used in the composition, I provide both together. These are placed in a hot place until melted. I prefer to place the mass in hot or boiling water. The two gums, if both are used, being thus reduced to a soft state, are then again and again passed through between steam-heated rollers until the two substances are thus thoroughly mixed. At this state I introduce of the impalpable powders hereinafter named the desired quantity. The powders with the gums are to be ground together by repeated passing through the steam-heated rollers. (These steam-heated rollers are of common construction, as used in all factories where these gums are worked, and consist of two cylinders, driven by gearing, so arranged as to run at different speeds each. Each is made with a hollow center, and has arrangements for the induction of steam at one end and its eduction at the other, and by this means the two cylinders are heated and kept hot, the degree of heat being governed by the judgment of the operator.) The gums and metals or other substances are by means of the repeated rollings thoroughly amalgamated and become a composition of such character as is hereinafter fully set forth.

The heat is indispensable to keep the gum soft when it is desired to work it. On the contrary, the cold will render it hard. The metal, &c., is introduced to produce or aid in giving hardness to the mass of composition. Such is the nature of the materials that extreme heat and cold both have the designed effect to vary the degree of hardness in the composition.

I will also add that if the article used is in the form of an impalpable powder it will always thoroughly unite or combine with the gum. On the contrary, if in any coarser state no amalgamation will be formed. This I believe to be imperative.

I will also remark that gutta-percha, when unmixed with other articles, is found to become old or brittle and decayed (by age) to its entire destruction. (It is believed an oil which is natural to the gums exudes in time.) Be this as it may, it is certain that the hard compositions will retain all the component parts as set forth in the following receipts.

*Composition A.*—This composition is of the most durable character, and it consists of four parts of gutta-percha, one part of caoutchouc, one part of peroxide of antimony, one part of peroxide of zinc, three parts of peroxide of iron. This is to be ground together, as hereinbefore stated.

*Composition B.*—This is more plastic under heat, and consists of four parts of gutta-percha, one part of caoutchouc, three parts of peroxide of zinc, two parts of peroxide of iron.

*Composition C.*—This may be rendered very hard. To the gum (gutta-percha) add of peroxide of iron in the proportion of seven of the oxide to three of gum. This composition will be incapable of reuse more than a few times without reduction by the introduction of more gum.

*Composition D.*—This is for a less degree of hardness—that is, it may be used over and over by reheating and working. To six parts of gum (five of gutta-percha and one of rubber) add two of antimony and two of peroxide of iron.

*Composition E.*—A composition of the following kind may be used in very cold weather: six parts gutta-percha, one peroxide of zinc, three peroxide of iron.

*Composition F.*—This composition may be made up of one part franklinite, one part antimony, four parts peroxide of iron, and four parts gutta-percha. This is very good, and for every day and continuous use is very excellent for stereotype-molds, and in warm weather for plates.

*Composition G.*—This is made of equal parts of franklinite and gum, (gutta-percha.)

*Composition H.*—This is equal parts of franklinite, antimony, and gum, (gutta-percha.)

*Composition I.*—This is of equal parts of gum and oxide of iron.

*Composition K.*—This is of equal parts of antimony, (pure oxide,) and gum, (gutta-percha.)

*Composition M.*—Equal parts of flour-glass (impalpable) and gutta-percha gum.

*Composition N.*—This is of equal parts of flour (impalpable) of manufactured chinaware and gum, (gutta-percha.)

*Composition O.*—This is of gum and flour of earthenware, equal parts.

*Composition P.*—Equal parts of clay (mostly ocher) and gum.

In the foregoing composition I use the materials named, as follows, viz: The gums should be pure; the peroxide of iron as fine as acids will reduce it, or ninety-six per cent. pure oxide of iron. The oxide of antimony should be perfectly pure; the oxide of zinc also perfectly pure; the glass, best white; the china, pure; the earthenware, best white; the clays very pure, natural, inclined to ocher. The franklinite is a natural mineral, found in the State of New Jersey, and from this the zinc paint or pure oxide of zinc is made. It contains, by analysis, seventy parts zinc, ten parts iron, seven parts red oxide of iron, the balance manganese and natural earths. The plumbago or black lead is not very valuable as an ingredient for mixture, but is very valuable as a lubricator, having been used in England for this purpose. In short, the cylinders, the hands, the types, the frames and molds, and all the various articles must be coated with this material or some equivalent, which equivalent I have not found.

It is a well established fact that gutta-percha possesses full powers of flexibility, but no elasticity. On the contrary, caoutchouc or india-rubber possesses both elasticity and flexibility. Although the manufacture of these gums has been carried to a considerable extent, yet it is doubtful if even a tithe of their real usefulness is as yet known. In adapting them to this use I have endeavored to include something before undiscovered, and flatter myself that my exertions have been as novel in their application as they prove to be useful in their result. From the foregoing receipts and remarks it will be seen that I have aimed at rendering this flexibility a nullity, or nearly so, while I retain the adhesive powers of the gum for the purpose of holding in contact the particles of metal. The compositions hereinbefore named all partake more or less of the hardening quality, except the oxide of zinc, which tends to soften the gutta-percha, but takes from its flexibility, and the oxide of antimony, which neutralizes the gum, yet withdrawing from its flexibilty. Plumbago or black lead acts substantially the same as oxide of antimony. The peroxide of iron is the greatest hardener I have found.

These various compositions are intended to furnish various degrees of hardness in the hardened state, but will all admit of softening by heat, as set forth herein, more or less, and oftener or less often, as may be required, according to the use they may be applied to or its requirements. Experiments in the hardening of these gums have before been made. Mr. Goodyear, in this country, has obtained a patent for a hard gum, and in England the hard material has been produced. So far as history goes, however, we have no evidence of the gums having been rendered inflexible, except by the curing or heating principle, or in the same manner as india-rubber is cured. The gum thus hardened is permanently hard, and is incapable of resoftening and rehardening; consequently incapable of repeated use over and over again, as the compositions I prepare are. This ability to reuse is what I consider the valuable part of my discovery, so far as application to use is concerned, and I believe this arises entirely from the use of unprepared—that is, uncured—gum.

It will from the foregoing be understood that I may by the use of more or less of different metals, or by the use of both gums named, render my compositions more or less hard or more durable than the natural gum (gutta-percha,) yet I do not by this mean to debar myself of the apparent fact that more or less of the metals referred to will produce in some degree a like result; but the amalgamation, I think, is better when the larger number is used. Certain it is the composition is very much better. I therefore maintian that I have accomplished the attainment of making the gum inflexible, or so far inflexible as may be required for use in the arts, and for such purposes as it is desirable to apply a composition which may be molded in a soft state, and will by its own cooling become hard, or it may be hardened and softened at will. Notwithstanding the before-named compositions and remarks applicable thereto, I prefer to make the stereotype-molds of a simple compound of the oxide of iron and gutta-percha in about the proportion of one-half gum and one-half oxide of iron for use in cold weather, increasing the amount or proportion of oxide of iron to three-quarters or even more for warm weather. For the use in making stereotype-plates it is valuable to introduce some softening or modifying material. Therefore I use, in preference to other materials, the oxide of antimony—say, one eighth, more or less—three-eighths oxide of iron, and one-half gutta-percha, subject to the variations in hot or cold weather, as in the case of the mold.

Having thus stated clearly the nature and described the process of preparing my gum compound, specially adapted to the stereotype plates and molds, I wish it to be distinctly understood that I do not claim the mixture of these gums, gutta-percha, india-rubber, &c., with other non-elastic gums, resins, &c., as shellac, resin, sulphur, &c.; nor do I claim vulcanizing; nor do I use vulcanized compounds; nor do I claim mixing the elastic gums with the alkaline earths or earths proper, nor with the carbonates nor the sulphates of these bases, as pulverized marble, plater-of-paris, Epsom salts, &c., all of these things having been done before by Nelson Goodyear and others for hardening and otherwise modifying the elastic gums; but What I do claim as my invention, and desire to secure by Letters Patent, is—

The making of stereotype molds and plates of the raw or uncured gum, combined with the pulverized oxides of iron and antimony, or their equivalents, in manner and for the purposes herein set forth.

J. L. KINGSLEY.

Witnesses:
GEO. R. WEST,
H. H. YOUNG.